K. KAWAHARA.
SAW FILING MACHINE.
APPLICATION FILED JUNE 20, 1916.
1,209,166.
Patented Dec. 19, 1916.
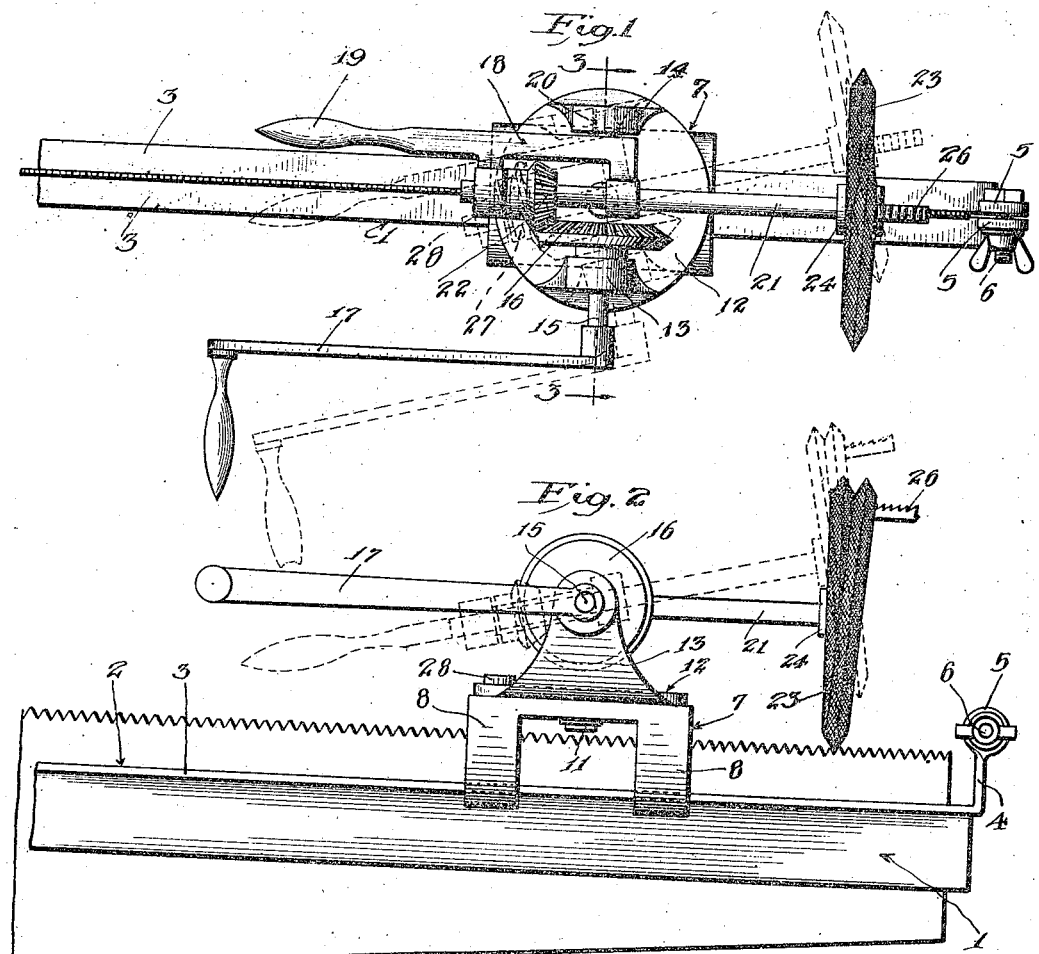
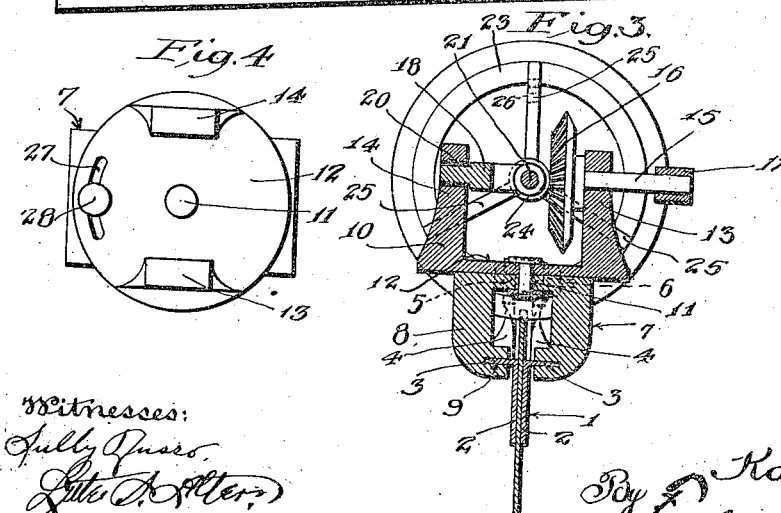

UNITED STATES PATENT OFFICE.

KOSA KAWAHARA, OF LOS ANGELES, CALIFORNIA.

SAW-FILING MACHINE.

1,209,166.  Specification of Letters Patent.  Patented Dec. 19, 1916.

Application filed June 20, 1916. Serial No. 104,675.

*To all whom it may concern:*

Be it known that I, KOSA KAWAHARA, a subject of the Emperor of Japan, residing at Los Angeles, in the county of Los Angeles and State of California, have invented a new and useful Saw-Filing Machine, of which the following is a specification.

This invention relates to improvements in saw filing machines and resides in the provision of a simple and comparatively small device of this character which may be operated easily to reliably sharpen the teeth of saws in an expeditious manner.

Another object of this invention is to provide a circular saw tooth filing member which is rotated to sharpen saw teeth and may be held in various angular positions relative to the saw teeth while in operation.

A further object is to provide a rotary saw tooth filing member of the character described which when rotated will advance along the edge of the saw and operate upon first one tooth and then another.

In the drawings, Figure 1 is a top plan view of the saw filing machine. Fig. 2 is a side elevation. Fig. 3 is a vertical sectional view taken on the line 3—3 of Fig. 1, and Fig. 4 is a detail top plan view of the carriage.

Referring to the drawings, 1 designates a saw blade clamp which comprises elongated jaws 2, each jaw being formed with a lateral flange 3 on its upper edge. Each of these jaws 2 is provided with an upstanding arm 4 at each end. Eyes 5 are formed in the upper ends of the arms 4 and register with one another so as to receive screws 6, the latter being provided to clamp the jaws upon the saw blade.

Slidably mounted upon the clamp 1 is a carriage 7, which is provided with depending opposed retaining and guide arms 8. The arms 8 are provided in their opposed faces with grooves 9 which receive the flanges 3. A bearing 10 is pivoted, as at 11, centrally thereof upon the carriage 7 and comprises a flanged plate 12 which carries upstanding opposed arms 13 and 14. Rotatably mounted within the arm 13 is a shaft 15, having keyed thereon a miter gear 16. A crank 17 is fixed to the shaft 15 and provides means for rotating the shaft and miter gear.

A bearing member 18, including a handle 19 which extends parallel to the crank 17, is pivoted as at 20 upon the arm 14 and rotatably supports a shaft 21. A miter gear 22 is fixed to the shaft 21 and meshes with the gear 16. It will thus be seen that by grasping the handle 19 and moving the bearing member 18 up and down upon its pivot 20, the shaft 21 may be raised or lowered as desired. The handle 19 also provides for the turning of the bearing member 10 from left to right.

Fixed upon the shaft 21 is a circular saw tooth filing member 23 in the form of a split ring and which is substantially triangular in cross section, the ends thereof being overlapped so that they lie in the same plane as shown clearly in Fig. 2 of the drawings. A hub member 24 carrying spokes 25 supports the member 23, said spokes being notched on their outer ends so as to slidably engage and support the member 23.

There is provided means for adjusting the ends of the member 23 so that they lie in different spaced positions, and said means comprises a horizontal rack member or notched plate 26 which is carried by one of the spokes 25. The member 23 is provided at one end with a ridge which is adapted to engage in the notches of the rack member 26 and by moving said end of the member 23 outwardly and into the notches the adjustment of the member 23 may be provided for as desired. This adjustment will be made in accordance with the character of the saw, for example, when the saw teeth are a greater distance apart than those shown in the drawings, the ends of the member 23 will be moved apart a distance corresponding to the teeth of the saw so that when the member 23 is rotated it will operate upon first one tooth and then the other, in succession.

In use, the saw to be filed is held in a vise or the like, not shown, and is clamped by the member 1, as shown in Fig. 3 of the drawings. The handle 19 is grasped so as to move the member 23 at the proper angle to sharpen the teeth of the saw, such angle usually being approximately 35° relative to the longitudinal axis of the saw. By holding the handle 19 the operator may grasp the crank 17 and turn the same to rotate the shaft 21 through the medium of the gears 16 and 22, said holding of the handle 19 providing for the steadying of the device and permitting the operator to raise or lower the member 23 relative to the saw blade, as desired. It will thus be seen that the operator has immediate control of the device at all times. When it is desired to hold the member 23 to one side or the other of the saw, this may be done by turning the bearing 10 upon its pivot 11 and effected through the handle 19. The carriage 7 is free to slide upon the clamp 1. In order to hold the member 23 in its adjusted position the plate 12 is provided with a slot 27 in which is mounted a set screw 28, the latter being secured to the carriage 7 and arranged to bear against the plate 12. By tightening this screw the plate 12 and parts supported thereby will be held in the desired position.

With reference to the foregoing description and accompanying drawings, it will be seen that I have provided a saw filing machine in which the operator may at the time of rotating the saw tooth filing member hold or move said member in any position such as will be desired in the operation of filing the teeth of the saw, whether it be up away from the teeth to one side or the other of the saw blade at an angle to the teeth, or toward and away from the teeth in a substantially horizontal plane.

I claim:

1. A saw filing machine comprising a saw blade clamp, a carriage slidable upon the clamp, a bearing member rotatably mounted upon the carriage, a rotatable shaft, a bearing for said shaft pivoted upon the rotatable bearing, a saw tooth filing member fixed to the shaft, means to rotate the shaft, and a handle carried by the last named bearing.

2. A saw filing machine comprising a saw blade clamp, a carriage slidable upon the clamp, a supporting member rotatably mounted upon the carriage, a bearing member pivoted for vertical movement upon the supporting member, a shaft journaled in the supporting member, a pinion on said shaft, a crank connected to said shaft, a circular saw tooth filing member, a shaft for supporting said member journaled in the bearing member, a pinion fixed to said last named shaft and meshing with the first named pinion, and a handle carried by the bearing member.

3. A saw filing machine comprising a saw blade clamp, a carriage slidable upon the clamp, a supporting member rotatably mounted upon the carriage, a bearing member pivoted for vertical movement upon the supporting member, a shaft journaled in the supporting member, a pinion on said shaft, a crank connected to said shaft, a circular saw tooth filing member, a shaft for supporting said member journaled in the bearing member, a pinion fixed to said last named shaft and meshing with the first named pinion, and a handle carried by the bearing member, said filing member having its ends overlapped and located in the same plane.

Signed at Los Angeles, California, this 13th day of June, 1916.

KOSA KAWAHARA.

Witnesses:
CHAS. J. OHUNN,
MASAYOSHI KOJIME.